UNITED STATES PATENT OFFICE.

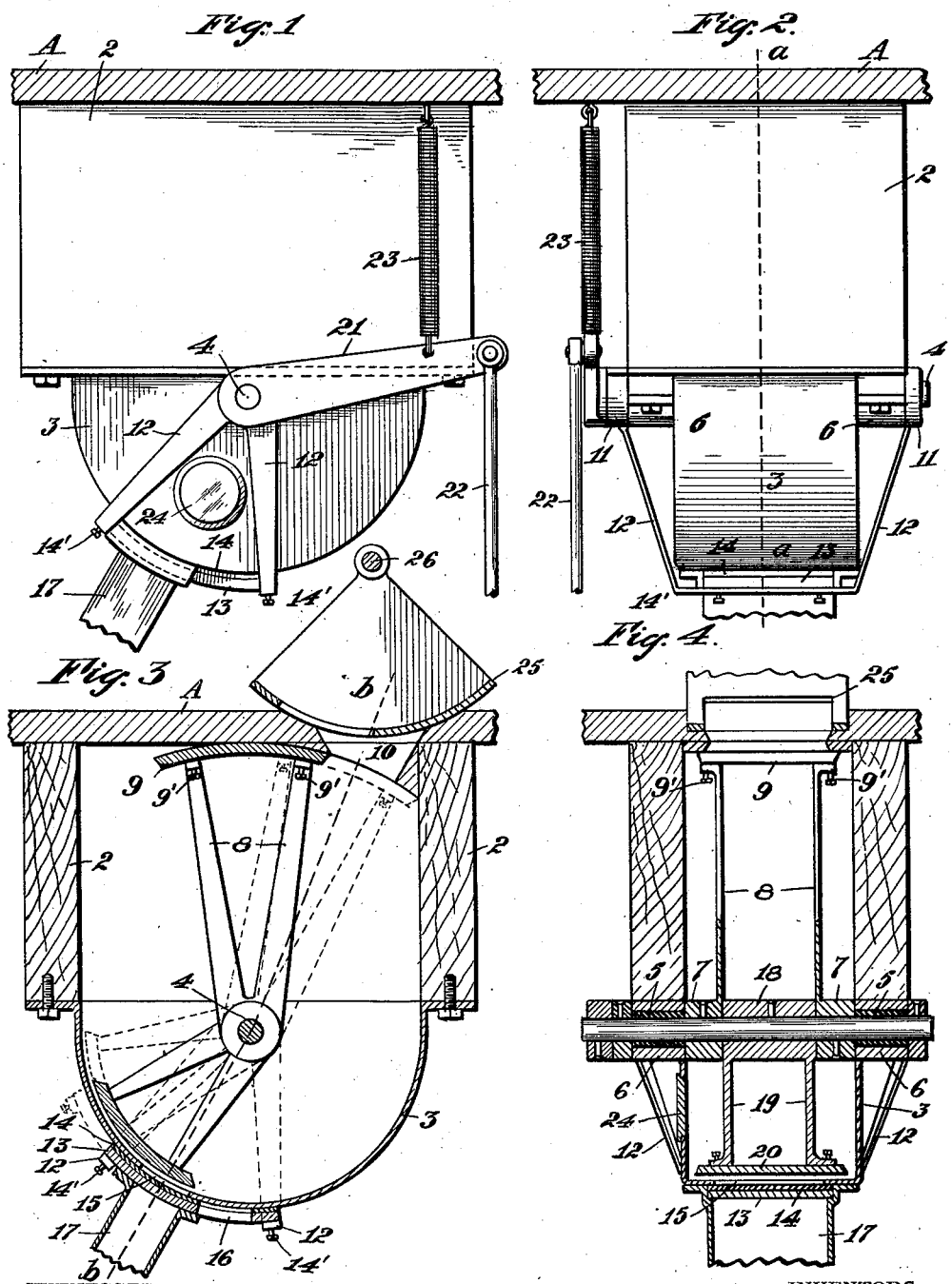

ERNST F. ROSSOW AND MARY E. ROSSOW, OF BERKELEY, CALIFORNIA.

AUTOMATIC FEED-HOPPER.

1,088,096.  Specification of Letters Patent.  Patented Feb. 24, 1914.

Application filed May 7, 1913. Serial No. 766,079.

*To all whom it may concern:*

Be it known that we, ERNST F. Rossow and MARY E. Rossow, citizens of the United States, residing at Berkeley, in the county of Alameda and State of California, have invented new and useful Improvements in Automatic Feed-Hoppers, of which the following is a specification.

This invention relates to a feed-hopper and particularly pertains to an automatic feed-hopper for discharging granular materials from bunkers and other receptacles.

It is the object of this invention to provide a hopper having closable inlet and outlet openings adapted to be alternately opened and closed in relation to each other in such manner that when the outlet opening is open to discharge the inlet opening will be closed and vice versa.

A further object is to provide a feed-hopper which is adapted to be connected to a bunker or other container, for the reception and delivery of granular materials such as sand, crushed rock, coal, grain, sugar and other ground, loose or powdered substances, which is so constructed as to obstruct the flow of material into the hopper when the latter is discharging its contents so that the weight of material above the hopper will not affect the discharge therefrom.

Another object is to provide a hopper of the above character which is simple in construction, efficient and reliable in operation, economical in construction, and readily controlled either manually or mechanically.

Other objects will appear hereinafter.

The invention primarily resides in a hopper having an arcuate bottom formed with a discharge opening, and a closed top having an inlet opening, said inlet and discharge openings arranged on opposite sides of the vertical center of the hopper, closures for said inlet and discharge openings connected together to move in unison in an arc of a circle, and arranged so that one closure will be positioned to close its opening while the other will be disposed to uncover its opening, means for normally retaining the closure for the discharge opening in its closed position, and means for operating said closures to discharge the contents of the hopper.

The invention further consists of the parts and the construction and combination of parts as hereinafter more fully described and claimed, having reference to the accompanying drawings, in which—

Figure 1 is a view in end elevation of the hopper. Fig. 2 is a side elevation. Fig. 3 is a cross-section on the line *a—a* of Fig. 2. Fig. 4 is a longitudinal section on the line *b—b* of Fig. 3.

In the drawings A represents the top of the hopper which may be the floor or bottom of a bunker or other receptacle, but will hereinafter be designated as the top of the hopper. The sides of the hopper are indicated at 2; and comprise vertically arranged timbers constructed in the form of a rectangle and attached to the top A.

Mounted on the lower edge of the sides 2 is a semi-cylindrical bottom member 3, preferably formed of metal, and having a rock-shaft 4 extending axially therethrough; the rock-shaft 4 being journaled in suitable bearings 5 carried in hubs 6 formed on the vertical ends or sides of the bottom member 3. The bearings 5 are here shown as comprising graphite bushings but may be roller or other anti-friction bearings.

Rigidly mounted on the rock-shaft 4 within the hopper are collars 7 having upwardly extending members 8 formed thereon, on the outer ends of which members an arcuate closure plate 9 is adjustably mounted and adapted to be advanced in relation to the members 8 by means of set screws 9', the plate 9 being formed with a transverse curvature concentric with the axis of the shaft 5. The plate 9 is designed to form a closure for an inlet opening 10 formed in the top A of the hopper to one side of the vertical longitudinal center of the latter, the plate 9 however being normally positioned out of alinement with the opening 10, as shown in Fig. 3.

Secured to the shaft 5, exterior of the hopper and adjacent to the outer ends of the hubs 6, are collars 11 on which are formed downwardly extending divergent hangers 12 which terminate adjacent to the underside of the bottom 3 of the hopper, and are secured to the ends of a segmental plate 13 disposed beneath the bottom member 3 and extending lengthwise thereof. A wearing plate or shoe 14 is detachably secured to the upper face of the plate 13 and has its outer face contiguous to and in slidable contact with the underside or arcual face of the hopper bottom 3; the outer or wearing face of the shoe 14 conforming to the curvature of the bottom 3. The shoe 14 is formed of a soft metal such as brass so as not to frictionally engage the hopper bottom; the shoe 14 being set up or advanced by set screws 14', when sufficiently worn, to maintain it in contact with the hopper bottom.

Formed in the hopper bottom 3 is a discharge opening 15 which is positioned to one side of the vertical longitudinal center of the hopper and on the side opposite to that wherein the inlet opening 10 is arranged, so as to dispose the inlet and outlet openings out of vertical alinement with each other. The discharge opening 15 is designed to be normally closed by the shoe 14 on the plate 13, as shown in Fig. 3; the shoe 14 and plate 13 being formed however with an aperture 16 adapted to register with the discharge opening 15 when the plate 13 is moved into the position shown in dotted lines in Fig. 3, as will be later described.

Connected to the hopper bottom 3, and disposed to communicate with the discharge opening 15 when the aperture 16 in the plate 13 registers therewith, is a chute 17 which leads to any suitable point of discharge and is preferably arranged at an angle of 60 degrees with the horizontal; the sides of the chute being slotted adjacent to the hopper bottom to receive the plate 13 and its shoe.

Mounted on the shaft 4, between the collars 7, is a collar 18 having projections 19 formed thereon which extend downwardly and have a plate 20 adjustably attached to their lower ends. The plate 20 and the projections 19 constitute an agitator adapted to operate when the rock-shaft 4 is actuated to loosen packed materials in the hopper and prevent choking of the outlet opening 15.

A lever-arm 21 is attached to one end of the rock-shaft 4 by means of which the shaft 4 may be rocked in its bearings. The lever-arm 21 may be operated in any desired manner, either manually or mechanically, and may be attached to an automatic weighing scale by means of a connecting-rod 22, if desired.

The lever-arm 21 is designed to be normally retained in its uppermost position by means of a helical spring 23 arranged to exert an upward pull on the lever-arm. It is manifest that any other means may be employed for normally maintaining the lever-arm 21 in such position that the discharge opening 15 will be normally closed by the plates 13 and 14 and the inlet opening 10 uncovered by the closure plate 9.

When the parts are disposed in the normal position just described, the hopper will be filled by the flow of material thereinto from above the top A through the opening 10; the materials being prevented from passing out of the hopper by reason of the discharge opening 15 being closed.

When it is desired to discharge the materials from the hopper the lever-arm 20 is actuated in opposition to the spring 23, so as to rock the rock-shaft 5 and thereby move the opening 16 in the plates 13 and 14 into register with the opening 15 in the hopper bottom. When this occurs, the materials in the hopper will enter the chute 17 and be conveyed to any suitable point. When the rock-shaft 4 is thus operated to discharge the contents of the hopper it will also operate to move the closure plate 9 over the inlet opening 10 to prevent the flow of material into the hopper during the time the discharge opening 15 remains in an open position. This prevents the weight of the body of materials above the hopper from accelerating the discharge therefrom.

By arranging the inlet and discharge openings of the hopper on opposite sides of the vertical center thereof, they are positioned out of alinement with each other so that when the closure 9 is restored to its normal position to uncover the inlet opening 10, the materials on being delivered to the hopper will not fall directly onto the closure plates 13 and 14 as the latter move to close the discharge opening 15. The closing of the discharge opening 15 and the uncovering of the inlet opening 10 is automatically effected by the action of the spring 23 on the release of the lever-arm 21. Another advantage derived from positioning the inlet and outlet openings of the hopper on opposite sides of the vertical center of the latter is that the closures may be moved simultaneously in opposite directions by a single operation of the rock-shaft. The openings 10 and 15, the closures therefor, and the length of travel of the latter, are so arranged and proportioned to each other that the openings 10 and 15 may be both partially uncovered at the same time, so that a slow continuous feed through the hopper may be obtained if desired. For the purpose of facilitating repairs or adjustments of the parts on the interior of the hopper, a man-hole having a suitable cover 24 is provided to permit of access to the interior of the hopper.

This invention is particularly adapted for use for heavy work and for handling large quantities of materials, but it is manifest that it is equally applicable for handling small quantities of light materials and can be constructed in sizes to suit the purposes to which it is to be put.

It will be understood that changes in the form, proportion, and minor details of construction may be restorted to within the scope of the appended claims, without departing from the spirit of the invention.

As it is desirable to regulate the flow of material through the opening 10, means are provided for adjusting the area of the opening 10 independent of the plate 9. This means is here shown as comprising a rockable shutter 25 mounted on a rock-shaft 26. The shutter 25 is positioned above the top A and is arranged in such manner that by operating the rock-shaft it may be oscillated and moved over the opening 10 to cover or uncover the latter to the desired degree.

Having thus described the invention, what is claimed and desired to be secured by Letters Patent is:

1. In a feed-hopper having a semi-cylindrical bottom with a discharge opening in the bottom and an inlet opening in the top, an adjustable closure for the inlet opening on the interior of the hopper, an adjustable closure for the outlet opening on the exterior of the hopper, a single rock shaft on which both of said closures are mounted to operate in unison, said closures so arranged in relation to each other that when one of the hopper openings is closed the other will be open, and means for rocking the rock-shaft.

2. A feed-hopper having a closed top and a semi-cylindrical bottom with an inlet opening in the top and a discharge opening in the bottom, said openings arranged out of vertical alinement with each other, a single rock-shaft extending through the hopper, a closure for the inlet opening disposed in the hopper and connected to the rock-shaft, an agitator carried by the rock-shaft inside the hopper, a closure for the discharge opening arranged exterior to the hopper, hangers connecting said closure to the rock-shaft, said closures so arranged in relation to each other that when one of the hopper openings is closed the other will be opened, means operating on the rock-shaft for normally maintaining the discharge opening closed and the inlet opening open, and means for actuating the rock-shaft to uncover the discharge opening and close the inlet opening.

3. A feed-hopper having an inlet opening in the top and a discharge opening in the bottom, said inlet and discharge openings arranged out of vertical alinement with each other, a rock-shaft extending into the hopper, collars secured to said shaft within the hopper, projections on said collars, an arcuate plate adjustably connected to said projections forming the closure for the inlet opening, hangers on said shaft exterior of the hopper, a plate carried by said hangers extending beneath the hopper, a shoe adjustably mounted on said plate in slidable contact with the hopper and adapted to close the discharge opening, said closure plates arranged in such relation to each other that when one opening is closed the other will be opened, and means for rocking the rock-shaft.

4. A feed-hopper having an inlet opening in the top and a discharge opening in the bottom, said inlet and discharge openings arranged out of vertical alinement with each other, a rock-shaft extending into the hopper, collars secured to said shaft within the hopper, projections on said collars, an arcuate plate adjustably connected to said projections forming a closure for the inlet opening, hangers on said shaft exterior of the hopper, a plate carried by said hangers extending beneath the hopper, a shoe adjustably mounted on said plate in slidable contact with the hopper and adapted to close the discharge opening, said closure plates arranged in such relation to each other that when one opening is closed the other will be opened, means for rocking the rock-shaft, and means for operating the rock-shaft for normally maintaining the discharge opening closed and the inlet opening open.

5. A feed-hopper having an inlet opening in the top and a discharge opening in the bottom, said inlet and discharge openings arranged out of vertical alinement with each other, a rock-shaft extending into the hopper, collars secured to said shaft within the hopper, projections on said collars, an arcuate plate adjustably connected to said projections forming the closure for the inlet opening, hangers on said shaft exterior of the hopper, a plate carried by said hangers extending beneath the hopper, a shoe adjustably mounted on said plate in slidable contact with the hopper and adapted to close the discharge opening, said closure plates arranged in such relation to each other that when one opening is closed the other will be opened, means for rocking the rock-shaft, means for operating the rock-shaft for normally maintaining the discharge opening closed and the inlet opening open, and agitating means carried by the rock-shaft within the hopper.

6. In a hopper having a closed top portion and a semi-cylindrical bottom portion with inlet and discharge openings in the top and bottom portion, respectively, arranged out of vertical alinement with each other, a shaft extending through the hopper, an arcuate plate adjustably mounted in relation to the shaft within the hopper and adapted to travel in the arc of a circle to alternately open and close the inlet opening in the top of the hopper, a closure plate extending beneath the hopper and attached to the rock-shaft, adapted to alternately open and close the discharge opening, said closure plate and arcuate plate so arranged in relation to each other on the rock-shaft that when the discharge opening is closed the intake opening will be opened and vice versa, means for normally maintaining the discharge opening closed, and means for rocking the rock-shaft to open the discharge opening.

7. In a hopper having a closed top portion and a semi-cylindrical bottom portion with inlet and discharge openings in the top and bottom portion, respectively, arranged out of vertical alinement with each other, a shaft extending through the hopper, an arcuate plate adjustably mounted in relation to the shaft within the hopper and adapted to travel in the arc of a circle to alternately open and close the inlet opening in the top of the hopper, a closure plate extending beneath the hopper and attached to the rock-shaft adapted to alternately open and close the discharge opening, said closure plate and arcuate plate so arranged in relation to each other on the rock-shaft that when the discharge opening is closed the intake opening will be opened and vice versa, means for normally maintaining the discharge opening closed, means for rocking the rock-shaft to open the discharge opening, and means on the rock-shaft for agitating materials within the hopper.

In testimony whereof we have hereunto set our hands in the presence of two subscribing witnesses.

ERNST F. ROSSOW.
MARY E. ROSSOW.

Witnesses:
JOHN H. HERRING,
IRVINE SINNETT.

Copies of this patent may be obtained for five cents each, by addressing the "Commissioner of Patents, Washington, D. C."